(12) United States Patent
Ben-Shalom et al.

(10) Patent No.: US 7,710,887 B2
(45) Date of Patent: May 4, 2010

(54) NETWORK PROTECTION VIA EMBEDDED CONTROLS

(75) Inventors: Omer Ben-Shalom, Rishon (IL); Adi Shaliv, Nir-Banim (IL)

(73) Assignee: Intel Corporation, Santa Clara, CA (US)

( * ) Notice: Subject to any disclaimer, the term of this patent is extended or adjusted under 35 U.S.C. 154(b) by 637 days.

(21) Appl. No.: 11/617,951

(22) Filed: Dec. 29, 2006

(65) Prior Publication Data

US 2008/0159152 A1 Jul. 3, 2008

(51) Int. Cl.
*H04J 3/14* (2006.01)
(52) U.S. Cl. .................................... 370/242; 370/389
(58) Field of Classification Search .................. None
See application file for complete search history.

(56) References Cited

U.S. PATENT DOCUMENTS

2004/0205419 A1* 10/2004 Liang et al. .................. 714/57
2006/0272025 A1* 11/2006 Mononen ..................... 726/26
2007/0157316 A1* 7/2007 Devereux et al. ............ 726/24
2007/0280105 A1 12/2007 Barkay

* cited by examiner

*Primary Examiner*—Frank Duong
(74) *Attorney, Agent, or Firm*—Grossman, Tucker, Perreault & Pfleger, PLLC

(57) ABSTRACT

The present disclosure provides a method for providing network protection. A method according to one embodiment may include detecting an infected data packet at an in-line device. The method may further include receiving a first instruction from the in-line device at a central management server, the instruction identifying the origin of the infected data packet. The method may also include receiving a marking instruction from the central management server at an infected endpoint device and marking outgoing data packets at the infected endpoint device to create marked data packets. Of course, many alternatives, variations and modifications are possible without departing from this embodiment.

30 Claims, 4 Drawing Sheets

| VERSION | IHL | ToS/DSCP | TOTAL LENGTH | |
|---|---|---|---|---|
| IDENTIFICATION | | | FLAGS | FRAGMENT OFFSET |
| TIME TO LIVE | | PROTOCOL | HEADER CHECKSUM | |
| SOURCE IP ADDRESS | | | | |
| DESTINATION IP ADDRESS | | | | |
| OPTIONS | | | | PADDING |

FIG. 3A

DIFFSERV FIELD

| DS5 | DS4 | DS3 | DS2 | DS1 | DS0 | ECN | ECN |
|---|---|---|---|---|---|---|---|

FIG. 3B

NETWORK PROTECTION VIA EMBEDDED CONTROLS

FIELD

The present disclosure describes a method for protecting networks and in-line devices using embedded controls.

BACKGROUND

Networks are used to distribute information among computer systems by sending the information in segments such as packets. A packet typically includes a "header" that directs the packet through the network to a destination, and a "payload" that stores a segment of information being sent through the network. At particular locations in the network, the packet header is accessed to identify the packet's destination and determine the path in the network to send the packet. To determine the path, data in the packet's header is compared to data stored at the network location for a potential match. By matching the header data and the locally stored data, an appropriate path is identified and the packet is sent over the path for delivery to its destination.

In general, an in-line device may refer to a specialized server or hardware device which does more than just forward packets as do hubs, switches and standard routers. As such it may require higher processing power per packet and may be capable of handling less than the traffic being handled by the simpler network devices. In-line devices may be used in a variety of different applications such as compression, intrusion prevention, application layer inspection, etc. Due to the relatively high central processing unit (CPU) requirements per packet, these devices may be susceptible to extremely high traffic flows, which may create both intentional and incidental denial of service (DoS) attacks on these devices. Some network devices may employ a number of different techniques in order to control and prioritize traffic.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIGS. 3A and 3B are diagrams showing examples of an IP packet header and the Differentiated Services packet format.

Although the following Detailed Description will proceed with reference being made to illustrative embodiments, many alternatives, modifications, and variations thereof will be apparent to those skilled in the art.

DETAILED DESCRIPTION

Generally, this disclosure describes a method for protecting in-line devices while allowing part (or potentially all) of the data packets suspected of infection to be handled by those devices. In some embodiments, resources may be used at the endpoint to mark data packets suspected of infection with a known specific low quality of service (QoS) marking including, but not limited to, that commonly used by the scavenger queue. The embodiments described herein may be configured to allow in-line devices to handle the actual expected traffic and some level of suspected traffic, while avoiding extreme, denial of service (DoS) situations.

Figure 1:
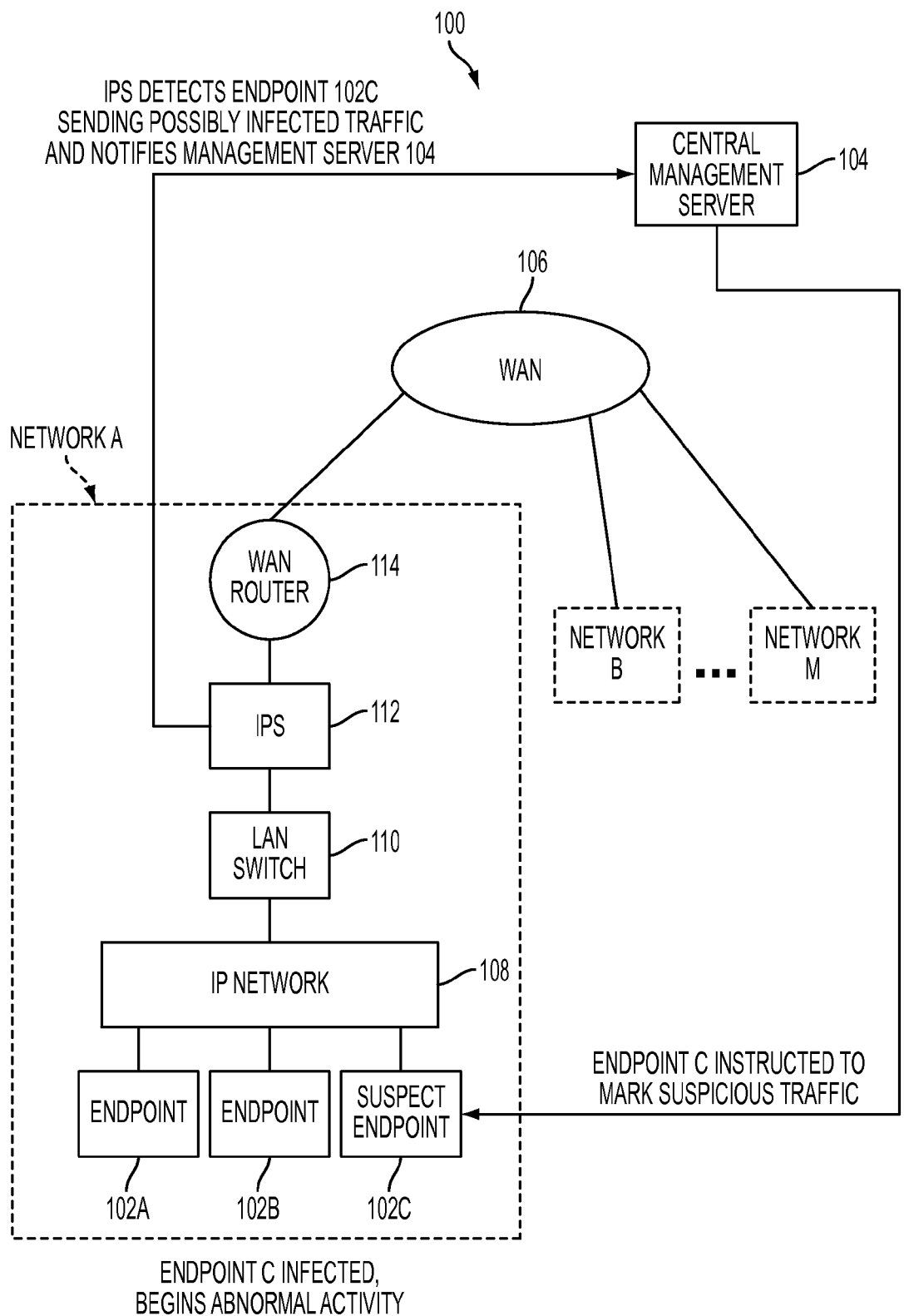
FIG. 1 is a block diagram showing one exemplary embodiment in accordance with the present disclosure.

FIG. 1 is an exemplary embodiment of a system 100 in accordance with the present disclosure. System 100 may include a series of networks, such as Networks A, B, M, etc. These networks may be personal area networks (PANs), local area networks (LANs), campus area networks (CANs), or metropolitan area networks (MANs). WAN 106 may be a centralized or distributed WAN and may have a wide array of connectivity options such as, but not limited to, leased line, circuit switching, packet switching and cell relay.

System 100 may include a number of endpoint devices 102A-C, which may be controlled by a central management server 104 through a network 106 such as a wide area network (WAN). An "endpoint" as used herein may refer to an individual computer system or device that may act as a network client and may serve as a workstation or personal computing device. An endpoint may be mobile and intermittently connected. Some examples of endpoints may include, but are not limited to, laptops, desktops and personal computing devices such as personal digital assistants (PDAs). An application server may be considered an endpoint when it functions as a network host.

Endpoint devices 102A-C may belong to the same Internet Protocol (IP) network 108 and may all be connected using VLAN switch 110, which may include LAN switches or other devices capable of creating a series of instant networks that contain only the two devices communicating at that particular moment. For example, LAN switches may be capable of inspecting data packets as they are received, determining the source and destination of each packet and forwarding it in an appropriate manner. Switch 110 may also be capable of connecting Ethernet, Token Ring, Fibre Channel or other types of packet switched networks together. System 100 may include switches, hubs (not shown) and/or hub/switch combinations as necessary. Switch 110 may implement QoS mechanisms to ensure that the amount of traffic marked with the selected QoS value forwarded to the in-line device, such as intrusion prevention system (IPS) 112, may not pass a known threshold. This threshold may be selected by an administrator to match the maximum resources the system is willing to utilize for the monitoring and/or processing of suspected traffic. For example, switch 110 may include an IPS connection port, which may provide a communication link to IPS 112 as well as other parts of system 100 further "upstream."

In some embodiments, intrusion prevention system 112 may include hardware/software platforms designed to analyze, detect and report on security related events. IPS 112 may be configured to inspect data packets and based on their configuration or security policy, drop any packets deemed malicious or detrimental. In some embodiments, IPS 112 may make access control decisions based upon application content, or may include certain functions such as making decisions based upon IP addresses or ports. Moreover, IPS 112 may be configured to detect suspicious traffic (e.g., viruses, malware, grayware, vulnerabilities, worms, etc.) and to notify central management server 104 upon detection. IPS 112 may also instruct central management server 104 to instruct an infected endpoint to mark any data packets containing the suspicious and/or infected traffic or may instruct the infected endpoint directly. The actual marking of the data packet may occur in a variety of different locations, including, but not limited to, in the host operating system (OS) and/or a manageability entity in the endpoint, including, but not limited to, the Intel Active Management technology or a virtualized service OS within endpoint device 102. Of course, other locations are also within the scope of the present disclosure.

IPS 112 may be connected to a router 114 (e.g., WAN router) or similar device capable of forwarding data packets between a variety of different networks. Router 114 may include static and/or dynamic routers configured to utilize various routing algorithms such as distance vector and link state. Router 114 may be used in accordance with a number of different routing protocols. Some protocols may include, but are not limited to, Intermediate System to Intermediate System (IS-IS), Internet Packet Exchange (IPX), Netware Link Services Protocol (NLSP) and the Routing Information Protocol (RIP). Router 114 may be configured to provide communication from one network (e.g., Network A) to another (e.g., Network B) through a wide area network (WAN) 106, such as the Internet. Router 114 may be configured to deliver both expected data packets as well as any suspicious and/or infected data packets that are allowed to pass through IPS 112.

Although the detection of suspicious and/or infected data packets has been described with reference to IPS 112 this detection may occur in other areas of system 100. For example, infected endpoint device 102C, central management server 104 or an intrusion detection system (e.g., darknet) may be configured to detect the infected data packet.

In operation, system 100 may operate in the following manner. IPS 112 may be placed between the LAN and the WAN as shown in Network A of FIG. 1 or the protected entity may be WAN router 114, which, in some embodiments, may not handle the same traffic level as the LAN routers. However, other configurations are also within the scope of the present disclosure. In this example, one of the endpoints, such as suspected endpoint 102C may become infected and begin abnormal activity. IPS 112 may then detect that the abnormal activity originated from suspected endpoint 102C and may then send instructions to central management server 104 via some standard interface such as Simple Network Management Protocol (SNMP) or Windows Management Instrumentation (WMI). Central management server 104 may then send instructions to suspected endpoint 102C via another standard interface, including, but not limited to, Simple Object Access Protocol (SOAP) over Hypertext Transfer Protocol (HTTP), SOAP over Hypertext Transmission Protocol, Secure (HTTPS), etc. These instructions may cause suspected endpoint 102C to then mark all outgoing traffic at the source using techniques such as packet marking. In some embodiments, this packet marking may be performed using a built-in platform such as Intel® Active Management Technology (Intel® AMT). IPS 112 may be configured to send the packet marking requirement directly to this platform on the suspected endpoint 102C. Once the suspicious traffic is marked, in-line IPS 112 may only accept a certain amount of such traffic for further handling and/or analysis from the infected hosts within its LAN. IPS 112 may not handle infected traffic above a certain threshold, which may involve a denial of service (DoS) situation.

Figure 2:
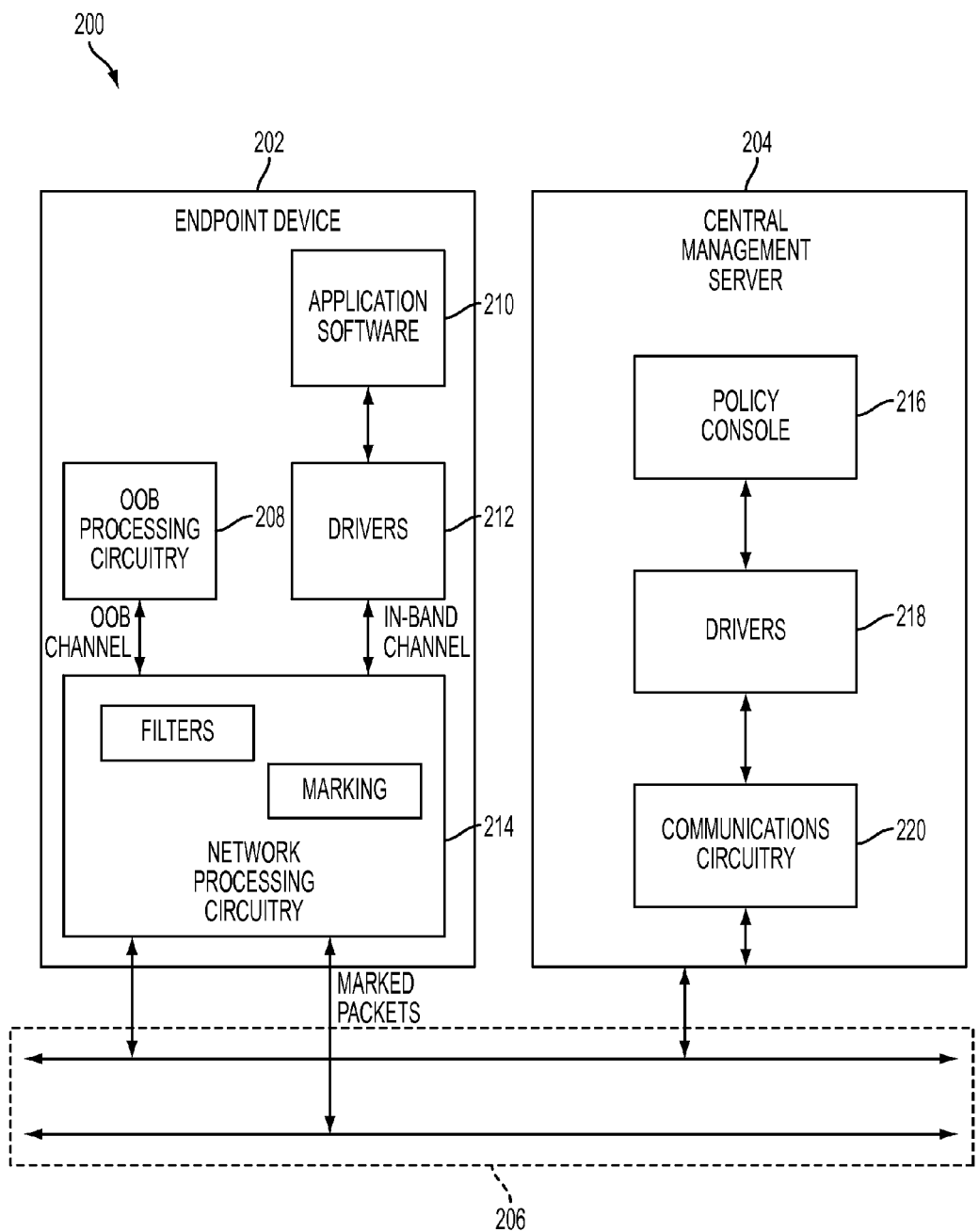
FIG. 2 is a block diagram showing another exemplary embodiment in accordance with the present disclosure.

FIG. 2 shows an exemplary embodiment of a system 200 in accordance with the present disclosure. System 200 may include an endpoint device 202 and central management server 204 interconnected via a network 206. Endpoint device 202 may include OOB management processing circuitry 208, application software 210, drivers 212 and network processing circuitry 214.

Network processing circuitry 214 may comprise circuitry that may be compatible and/or in compliance with the Intel® XScale™ Core micro-architecture described in "Intel® XScale™ Core Developers Manual," published December 2000 by the Assignee of the subject application. Of course, network processing circuitry 214 may comprise other types of processor core circuitry without departing from this embodiment. Network processing circuitry 214 may perform "control plane" tasks and management tasks (e.g., look-up table maintenance, etc.). Alternatively or additionally, network processing circuitry 214 may perform "data plane" tasks, which may be performed by the packet engines included in the packet engine array (not shown) and may provide additional packet processing threads. The packet engine array may include a plurality of packet engines. Each packet engine may provide multi-threading capability for executing instructions from an instruction set, such as a reduced instruction set computing (RISC) architecture. Each packet engine in the array may be capable of executing processes such as packet verifying, packet classifying, packet forwarding, and so forth, while leaving more complicated processing to network processing circuitry 214. Each packet engine in the array may include, for example, eight threads that interleave instructions (i.e., as one thread is active (executing instructions), other threads may retrieve instructions for later execution). Of course, one or more packet engines may utilize a greater or fewer number of threads without departing from this embodiment. The packet engines may communicate among each other, for example, by using neighbor registers in communication with an adjacent engine or engines or by using shared memory space.

Network processor circuitry 214 may be configured to perform a variety of different tasks within system 200. Some of these may include, but are not limited to, pattern matching (i.e., the ability to find specific patterns of bits or bytes within packets in a packet stream), key lookup (e.g., address lookup—the ability to quickly undertake a database lookup using a key (e.g., an address on a packet) to find a result, such as routing information), computations, data bitfield manipulation (i.e., the ability to change certain data fields contained in the packet as it is being processed), queue management (i.e., as packets are received, processed and scheduled to be send onwards, they may be stored in queues) and control processing (i.e., the micro operations of processing a packet may be controlled at a macro level which may involve communication and orchestration with other nodes in a system). In some embodiments, network processing circuitry 214 may be an Intel® Internet eXchange network processor (IXP). Moreover, OOB management processing circuitry 208 may control aspects of network processor circuitry 214 including, but not limited to, packet filtering and packet marking.

OOB management processing circuitry 208 may be in communication with central management server 204 through network 206. Central management server 204 may include, inter alia, policy console 216, drivers 218 and communications circuitry 220. Central management server 204 may communicate with endpoint device 202 (e.g., Intel AMT) through a secure out-of-band (OOB) channel (e.g., Simple Object Access Protocol (SOAP) over Hypertext Transfer Protocol (HTTP), SOAP over Hypertext Transmission Protocol, Secure (HTTPS), etc.). Policy console 216 may set the policies used to control the configuration of in-bound and out-bound filters of OOB management processing circuitry 208. Each packet sent or received by applications software 210 may pass through the filtering mechanisms of network processing circuitry 214, which may be controlled by OOB management processing circuitry 208.

OOB management processing circuitry 208 or network processing circuitry 214 may include packet filters that may be applied to both in-bound and out-bound packet streams. These filters may allow central management server 204 to pass or block specific IP based network flows and to keep traffic counts or log the occurrence of these flows. For example, in some embodiments, Intel® AMT may be used to support 32 in-bound and 32 out-bound filters. These filters may support bit-level masking of IP source and destination addresses and support ranges on source and destination ports. In some embodiments, OOB management processing circuitry 208 may be configured to mark suspicious and/or infected data packets using the DSCP field of the IP packet header, which is discussed in more detail below with reference to FIGS. 3A and 3B.

In some embodiments, application software 210 may implement an application that for execution, thus resulting in system 200 performing a given task or providing a service. Drivers 212 may provide a communication interface between application software 210 and network processing circuitry 214. Some types of application software may include, but are not limited to, the Quality of Service enforcement described herein (e.g., identifying different types or classes of packets and providing preferential treatment for some types or classes of packet at the expense of other types or classes of packet), packet or frame discrimination and forwarding (i.e., the basic operation of a router or switch), Access Control functions (e.g., determining whether a specific packet or stream of packets should be allowed to traverse the piece of network equipment), encryption of data streams (i.e., built in hardware-based encryption engines allow individual data flows to be encrypted by the processor) and Transmission Control Protocol (TCP) offload processing. Of course, various other applications may be used without departing from the scope of this disclosure.

As described above, OOB management processing circuitry 208 may include Intel® Active Management Technology (Intel® AMT) capabilities. The Intel® AMT embedded platform technology may enable out-of-band (OOB) access to hardware and software information stored in non-volatile memory on each endpoint device, eliminating the need for a functioning operating system and many of the software agents found in other management tools. Further, Intel® AMT may provide administrators with the ability to remotely inventory and gather information about endpoints and to then secure, diagnose and repair them, regardless of power or operational state.

OOB management processing circuitry 208 may be configured to identify and/or classify data packets emanating from endpoint device 202 with packet marking techniques. In some embodiments, this packet marking may include manipulation of the Differentiated Services Code Point (DSCP) subfield of the Internet Protocol (IP) header Type of Service (TOS) field. Differentiated services (DiffServ) may provide a networking architecture for the classification and management of network traffic as well as Quality of Service (QoS) mechanisms. The DiffServ field may be used in a network layer protocol (e.g., Internet Protocol Version 4 (Ipv4)) to make per-hop behavior (PHB) decisions about packet classification and traffic conditioning functions, such as metering, marking, shaping and policing. The six most significant bits of the DiffServ field may be referred to as the DSCP. The last two Currently Unused (CU) bits in the DiffServ field may be used as Explicit Congestion Notification (ECN) bits. The DSCP may define the manner in which LAN switch 110, IPS 112 and/or router 114 should queue packets while they are waiting to be forwarded. For example, infected and/or suspicious data packets emanating from an endpoint device (e.g., 102C or 202) may be given a low QoS (e.g., DSCP) marking, thus allowing LAN switch 110 (which may be QoS aware) to limit the amount of marked traffic forwarded to IPS 112, therefore allowing it to receive some level of traffic while preventing a complete DoS scenario. Other network devices in the core that support Diffserv may use the DSCP value in the IP header to select a PHB for the packet and provide the appropriate QoS treatment.

Referring now to FIGS. 3A and 3B, examples of an IP packet header and a DiffServ field are shown. In FIG. 3A, the DSCP field is shown within Type of Service (ToS) portion of the IP packet header. This field may provide an indication of the abstract parameters of the quality of service desired. These parameters may be used to guide the selection of the actual service parameters when transmitting a data packet through a particular network. Several networks offer service precedence, which may treat high precedence traffic as more important than other traffic (generally by accepting only traffic above a certain precedence at time of high load). In FIG. 3B the first six bits (DS5-DS0) correspond to the DSCP and the final two bits (ECN) correspond to the Explicit Congestion Notification bits. The standardized DiffServ field of the packet may be marked with a value so that the packet receives a particular forwarding treatment or PHB, at each network node. In some embodiments, the default DSCP may be 000 000. The DiffServ standard had utilized the same precedence bits (i.e., the most significant bits DS5, DS4 and DS3) for priority setting, and further clarified the definitions, offering finer granularity through the use of the next three bits in the DSCP. Table 1 shows the various precedence levels associated with the DiffServ architecture by RFC 791. However, in accordance with RFC 2474, all six bits may be used as arbitrary code points.

TABLE 1

| Precedence Level | Description |
| --- | --- |
| 7 | Stays the same (link layer and routing protocol keep alive) |
| 6 | Stays the same (used for IP routing protocols) |
| 5 | Express Forwarding (EF) |
| 4 | Class 4 |
| 3 | Class 3 |
| 2 | Class 2 |
| 1 | Class 1 |
| 0 | Best Effort |

In some embodiments, an in-line device (e.g., IPS 112) may prioritize traffic by class first. It may then differentiate and prioritize same-class traffic, taking the drop probability into account. The DiffServ standard may not specify a precise definition of "low," "medium," and "high" drop probability. Further, not all devices may recognize the DiffServ (DS2 and DS1) settings. When these settings are recognized, they do not necessarily trigger the same PHB forwarding action at each network node. Each node may implement its own response based on how it is configured.

The DSCP field may be used in a variety of different ways. For example, DSCP may be used to select a packet based on the contents of some portions of the packet header and apply PHB based on service characteristics defined by the DSCP value. Packet classification may involve using a traffic descriptor to categorize a packet within a specific group and making the packet accessible for QoS handling in the network. Using this packet classification, it may be possible to partition network traffic into multiple priority levels or a class of service (CoS). In some embodiments, the DSCP value may be used as a marker, where the DSCP field may be set based upon the traffic profile. For example, expected data packets may receive a first DSCP value, suspicious traffic may receive a second DSCP value and infected traffic may receive a third DSCP value. Setting the DSCP to a certain value at the edge of the network may make it easier for core devices to classify the packet and provide a suitable level of service. Moreover, the DSCP field may also be used to check compliance with the traffic profile using either a shaper or dropper function (e.g., metering). The values assigned to the set of DSCP tags may be backwards compatible with the legacy ToS IP precedence bits. Therefore, non-DSCP compliant, ToS-enabled devices should not conflict with the DSCP mapping. A default DSCP mapping to "best effort" forwarding will be applied if network rules are not defined or the devices are non-DSCP compliant.

As mentioned above, each in-line device or a management entity may set the policies of the network equipment they are connected through to permit a limited amount of marked traffic to pass therethrough. This may allow each IPS 112 to protect itself from malicious or suspect data packets by requesting that the endpoint device sending the traffic (e.g., 102C) mark down the flow to the specified class and have the network infrastructure (e.g., LAN switches) perform the actual rate limiting. In some embodiments, an embedded resource (e.g., network processing circuitry 214 implementing Intel® AMT policies) on the sending device may be instructed to block the traffic stream completely.

Although the embodiments described herein have made reference to an intrusion prevention system (IPS), it should be noted that a variety of other in-line devices may be used without departing from the scope of the present disclosure. Some of these devices may include, but are not limited to, WAN routers, intrusion detection systems (IDS), network accelerators, application specific gateways, etc.

Figure 4:
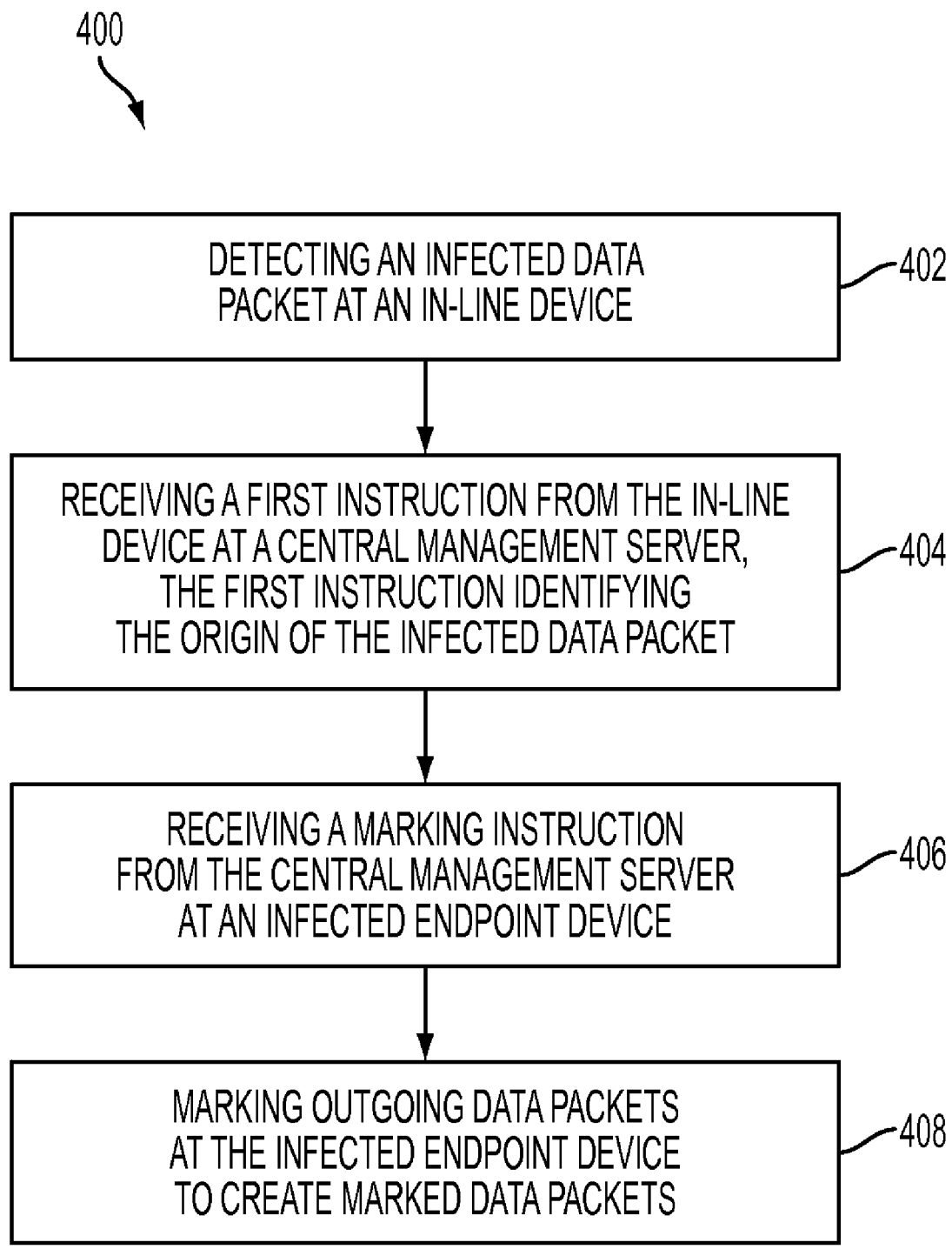
FIG. 4 is a flowchart showing operations in accordance with another exemplary embodiment of the present disclosure.

FIG. 4 is a flowchart 400 illustrating one method consistent with the present disclosure. Flowchart 400 depicts operations that may be used to protect a network from infected data packets. Operations may include detecting an infected data packet at an in-line device (402). Operations may further include receiving a first instruction from the in-line device at a central management server, the instruction identifying the origin of the infected data packet (404). Operations may also include receiving a marking instruction from the central management server at an infected endpoint device (406) and marking outgoing data packets at the infected endpoint device to create marked data packets (408). Of course, additional operations are also envisioned, such as, for example, preventing the marked packet to pass through the in-line device if a threshold has been reached, routing packets to a specific queue and/or limiting the packet rate on the network.

As used in any embodiment described herein, "circuitry" may comprise, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof.

The embodiments described above may be implemented in a computer program that may be stored on a storage medium having instructions to program a system to perform the methods. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions. Other embodiments may be implemented as software modules executed by a programmable control device.

The present disclosure may provide numerous advantages over the prior art. The embedded control technique described herein may allow for a continuous analysis of data packets without endangering the in-line devices of the network. The embedded controls may utilize a QoS approach to allow traffic flow without blocking traffic completely. In the event of a true DoS situation, the packet marking technique described herein may work in conjunction with existing techniques to safeguard the embedded device from the attack.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A system comprising:
an in-line device configured to detect an infected data packet;
a central management server configured to receive a first instruction from the in-line device, the instruction identifying the origin of the infected data packet; and
an infected endpoint device configured to receive a second instruction from the central management server and to mark outgoing data packets to create marked data packets.

2. The system according to claim 1, wherein the in-line device is configured to prevent the marked data packets from passing through if a threshold has been reached.

3. The system according to claim 1, wherein the outgoing data packets are marked using a Differentiated Services Code Point (DSCP) field, the DSCP field including Quality of Service (QoS) information.

4. The system according to claim 3, wherein at least one of the marked data packets and at least one expected data packet may be allowed to pass through the in-line device after evaluating the QoS information of the DSCP field.

5. The system according to claim 4, further comprising a switch configured to prevent a marked data packet to pass through the in-line device if a threshold has been reached.

6. The system according to claim 5, wherein the threshold corresponds to a maximum amount of marked data packets supported by the in-line device.

7. The system according to claim 1, wherein the in-line device is configured to send instructions to the central management server via an interface.

8. The system according to claim 7, wherein the interface is selected from the group consisting of Simple Network Management Protocol (SNMP) and Windows Management Instrumentation (WMI).

9. The system according to claim 1, wherein the infected endpoint device includes out-of-band (OOB) management processing circuitry configured to mark the outgoing packets.

10. The system according to claim 1, wherein the in-line device is selected from the group consisting of intrusion prevention systems (IPS), intrusion detection systems (IDS), network accelerators and application gateways.

11. The system according to claim 1, wherein the infected endpoint device, the central management server or an intrusion detection system are configured to detect the infected data packet.

12. An article comprising a storage medium having stored thereon instructions that when executed by a machine result in the following:
   detecting an infected data packet at an in-line device;
   receiving a first instruction from the in-line device at a central management server, the instruction identifying the origin of the infected data packet;
   receiving a marking instruction from the central management server at an infected endpoint device; and
   marking outgoing data packets at the infected endpoint device to create marked data packets.

13. The article according to claim 12, further comprising preventing the marked data packets from passing through the in-line device if a threshold has been reached.

14. The article according to claim 12, wherein marking the outgoing data packets comprises using a Differentiated Services Code Point (DSCP) field, the DSCP field including Quality of Service (QoS) information.

15. The article according to claim 14, wherein at least one marked data packet and at least one expected data packet may be allowed to pass through the in-line device after evaluating the QoS information of the DSCP field.

16. The article according to claim 15, further comprising preventing a marked data packet to pass through the in-line device if a threshold has been reached using a switch.

17. The article according to claim 16, wherein the threshold corresponds to a maximum amount of marked data packets supported by the in-line device.

18. The article according to claim 12, further comprising sending instructions from the in-line device to the central management server via an interface.

19. The article according to claim 18, wherein the interface is selected from the group consisting of Simple Network Management Protocol (SNMP) and Windows Management Instrumentation (WMI).

20. The article according to claim 12, wherein marking outgoing data packets at the infected endpoint device to create marked data packets is performed via out-of-band (OOB) management processing circuitry.

21. The article according to claim 12, wherein the in-line device is selected from the group consisting of intrusion prevention systems (IPS), intrusion detection systems (IDS), network accelerators and application gateways.

22. The article according to claim 12, wherein detecting an infected data packet occurs in the infected endpoint device, the central management server or an intrusion detection system.

23. A method of providing network protection comprising:
   detecting an infected data packet at an in-line device;
   receiving a first instruction from the in-line device at a central management server, the instruction identifying the origin of the infected data packet;
   receiving a marking instruction from the central management server at an infected endpoint device; and
   marking outgoing data packets at the infected endpoint device to create marked data packets.

24. The method according to claim 23, further comprising preventing the marked data packets from passing through the in-line device if a threshold has been reached.

25. The method according to claim 23, wherein marking the outgoing data packets comprises using a Differentiated Services Code Point (DSCP) field, the DSCP field including Quality of Service (QoS) information.

26. The method according to claim 25, wherein at least one marked data packet and at least one expected data packet may be allowed to pass through the in-line device after evaluating the QoS information of the DSCP field.

27. The method according to claim 26, further comprising preventing a marked data packet to pass through the in-line device if a threshold has been reached using a switch.

28. The method according to claim 27, wherein the threshold corresponds to a maximum amount of marked data packets supported by the in-line device.

29. The method according to claim 23, wherein detecting an infected data packet occurs in the infected endpoint device, the central management server or an intrusion detection system.

30. The method according to claim 23, wherein the in-line device is selected from the group consisting of intrusion prevention systems (IPS), intrusion detection systems (IDS), network accelerators and application gateways.

* * * * *